(12) United States Patent
Yuan

(10) Patent No.: US 9,988,296 B2
(45) Date of Patent: Jun. 5, 2018

(54) OPTICAL GLASS AND OPTICAL ELEMENT

(71) Applicant: CDGM GLASS CO., LTD., Chengdu, Sichuan (CN)

(72) Inventor: Wei Yuan, Chengdu (CN)

(73) Assignee: CDGM GLASS CO., LTD., Chengdu (CN)

(*) Notice: Subject to any disclaimer, the term of this patent is extended or adjusted under 35 U.S.C. 154(b) by 0 days. days.

(21) Appl. No.: 15/468,474

(22) Filed: Mar. 24, 2017

(65) Prior Publication Data

US 2018/0065880 A1   Mar. 8, 2018

(30) Foreign Application Priority Data

Sep. 5, 2016  (CN) .......................... 2016 1 0801537

(51) Int. Cl.
*C03C 3/062* (2006.01)
*C03C 4/00* (2006.01)
*C03C 4/20* (2006.01)

(52) U.S. Cl.
CPC ............ *C03C 3/062* (2013.01); *C03C 4/0092* (2013.01); *C03C 4/20* (2013.01); *C03C 2204/00* (2013.01)

(58) Field of Classification Search
CPC ......... C03C 3/062; C03C 3/064; C03C 3/066; C03C 3/068
See application file for complete search history.

(56) References Cited

FOREIGN PATENT DOCUMENTS

| | | |
|---|---|---|
| CN | 1915875 B | 8/2010 |
| JP | S48-034913 A | 5/1973 |
| JP | 2004-161598 A | 6/2004 |

*Primary Examiner* — Elizabeth A. Bolden
(74) *Attorney, Agent, or Firm* — Oliff PLC

(57) ABSTRACT

The present invention provides a high refractivity and high dispersion optical glass and optical element with small relative partial dispersion (Pg,F), high transmittance and good chemical stability. For optical glass, with anion as $O^{2-}$, wherein a cation thereof contains the following components by weight percentage: 12-25% of $Si^{4+}$; 58-75% of $Nb^{5+}+W^{6+}+Zr^{4+}$; 8-25% of $Li^++Na^++K^+$; 10% of $Ba^{2+}$ or less. Based on the reasonable component design, the refractive index of the optical glass is 1.81-1.89, the Abbe number is 20-29, Pg,F is 0.5956-0.6199, and the corresponding wave length $\lambda_{70}$ is below 450 nm when the transmittance reaches up to 70%. Therefore, the optical glass provided by the present invention is applicable to high-quality optical elements.

15 Claims, No Drawings

OPTICAL GLASS AND OPTICAL ELEMENT

TECHNICAL FIELD

The invention relates to an optical glass and optical element, wherein the optical glass has a refractive index (nd) of 1.81-1.89, with the Abbe number (vd) of 20-29, and in particular to a chemically stable optical glass and optical element with high transmittance, of which the refractive index and dispersion are high and the relative partial dispersion Pg, F is small.

BACKGROUND

Optical glass with high refractive index and high dispersion serves as the extremely significant part of the optical instruments and photoelectric products. With the widespread of photoelectric products such as smart phone and SLR camera in recent years, higher requirements have been proposed for the performance of this type of optical glass, which means to reduce its Pg, F to better improve the chromatic aberration so as to enhance the imaging quality of the optical lens.

Among the currently known optical glasses which are of high refractive index and high dispersion and adopt $SiO_2$—$TiO_2$—$Nb_2O_5$—$Na_2O$—$BaO$ system, plenty of $TiO_2$ can be found in the glass system disclosed by CN1915875B, which not only degrades the transmittance of the glasses but can also increase the Pg, F in the glasses. The optical glass disclosed by JP S48-034913 adopts $SiO_2$—$TiO_2$—$Nb_2O_5$—$K_2O$ ($Na_2O$) system which shows the problem of high Tg and high Pg, F. Glasses disclosed by JP2004-161598 is easy to encounter the problem of devitrification, and expensive component of $GeO_2$ may probably involve in the components, which makes the glass price tend to be high and is not conducive to the industrialization production.

SUMMARY

The present invention provides a chemically stable optical glass and optical element with high transmittance, of which the refractive index and dispersion are high and the relative partial dispersion Pg, F is small.

To solve the technical problem, the present invention provides: an optical glass, with anion as $O^{2-}$, wherein a cation thereof contains the following components by weight percentage: 12-25% of $Si^{4+}$; 58-75% of $Nb^{5+}+W^{6+}+Zr^{4+}$; 8-25% of $Li^++Na^++K^+$; 10% of $Ba^{2+}$ or less.

Furthermore, the optical glass further contains: 0-5% of $B^{3+}$; 0-0.2% of $Sb^{3+}$; 0-10% of $Zn^{2+}+Sr^{2+}+Ca^{2+}$.

Furthermore, ($Ba^{2+}/Nb^{5+}$) is 0.5 or less.

Furthermore, $Ti^{4+}$ is not contained.

Furthermore, the optical glass contains: 12-23% of $Si^{4+}$; and/or 60-72% of $Nb^{5+}+W^{6+}+Zr^{4+}$; and/or 8-23% of $Li^++Na^++K^+$; and/or 0.5-8% of $Ba^{2+}$; and/or 0-3% of $B^{3+}$; and/or 0-0.1% of $Sb^{3+}$; and/or 0.3 of ($Ba^{2+}/Nb^{5+}$) or less; and/or 0-8% of $Zn^{2+}+Sr^{2+}+Ca^{2+}$.

Furthermore, the optical glass contains: 12-20% of $Si^{4+}$; and/or 62-70% of $Nb^{5+}+W^{6+}+Zr^{4+}$ and/or 10-20% of $Li^++Na^++K^+$; and/or 0-5% of $Zn^{2+}+Sr^{2+}+Ca^{2+}$; and/or 0.01-0.2 of ($Ba^{2+}/Nb^{5+}$).

Optical glass, with anion as $O^{2-}$, wherein a cation thereof contains the following components by weight percentage: 12-25% of $Si^{4+}$; 49.5-65% of $Nb^{5+}$; 0-8% of $Zr^{4+}$; 0-10% of $W^{6+}$; 8-25% of $Li^++Na^++K^+$; 10% of $Ba^{2+}$ or less.

Furthermore, the optical glass further contains: 0-5% of $B^{3+}$; 0-0.2% of $Sb^{3+}$; 0-10% of $Zn^{2+}+Sr^{2+}+Ca^{2+}$.

Furthermore, ($Ba^{2+}/Nb^{5+}$) is 0.5 or less.

Furthermore, $Ti^{4+}$ is not contained.

Furthermore, the optical glass contains: 12-23% of $Si^{4+}$; and/or 51-62% of $Nb^{5+}$; and/or 0.5-7.5% of $Zr^{4+}$; and/or 0.5-8.5% of $W^{6+}$; and/or 8-23% of $Li^++Na^++K^+$; and/or 0.5-8% of $Ba^{2+}$ and/or 0-8% of $Zn^{2+}+Sr^{2+}+Ca^{2+}$ and/or 0.3 of ($Ba^{2+}/Nb^{5+}$) or less; and/or 0-3% of $B^{3+}$; and/or 0-0.1% of $Sb^{3+}$.

Furthermore, the optical glass contains: 12-20% of $Si^{4+}$; and/or 0.01-0.2 of ($Ba^{2+}/Nb^{5+}$) and/or 10-20% of $Li^++Na^++K^+$; and/or 0-5% of $Zn^{2+}+Sr^{2+}+Ca^{2+}$; and/or 0.01-0.2 of ($Ba^{2+}/Nb^{5+}$).

Furthermore, the refractive index of the optical glass is 1.81-1.89, with Abbe number of 20-29 and Pg, F of 0.5956-0.6199; when transmittance reaches 70%, the corresponding wave length of λ70 is bellow 450 nm.

Optical instruments are made of above optical glasses.

The present invention is advantageous in the following aspects: applicable to high-quality optical elements, the reasonable component design provides the phosphate optical glass of the present invention with chemical stability and high transmittance, of which the refractive index and dispersion are high and the relative partial dispersion Pg, F is small.

DETAILED DESCRIPTION

The below will describe all components contained in the optical glass of the present invention in detail, and these components are represented by cation weight percentage. Anion in the optical glass of the present invention is $O^{2-}$.

$Si^{4+}$ is a cation component of glass formation body. A certain amount of $Si^{4+}$ may make the optical glass have a better chemical stability, and improve the transparency of glass. If the content of $Si^{4+}$ is lower than 12%, the refractive index of glass may not within the required range and if the content of $Si^{4+}$ is higher than 25%, the melting behavior of the optical glass reduces along with an increased softening temperature. Therefore, the content of $Si^{4+}$ is 12-25%, preferably 12-23%, further preferably 12-20%.

$Nb^{5+}$, $W^{6+}$ and $Zr^{4+}$ play comparatively significant role in making the optical glasses with high refractivity and high dispersion. If the total content of these components is less than 58%, the refractive index of glass may not within the required range; if exceeds 75%, the devitrification of the glasses occurs easily. Therefore, the total content ($Nb^{5+}+W^{6+}+Zr^{4+}$) of $Nb^{5+}$, $W^{6+}$ and $Zr^{4+}$ is 58-75%, preferably 60-72%, further preferably 62-70%.

$Nb^{5+}$ can achieve high refractivity and high dispersion of the optical glasses and besides, it plays the most important role in maintaining the glasses with small Pg, F and high transmittance. If the content of $Nb^{5+}$ is lower than 49.5%, the refractive index of glass may not within the required range and if the content of $Nb^{5+}$ is higher than 65%, the devitrification of the glasses occurs easily and Pg, F tends to become big, with decreasing of the transmittance. Therefore, the content of $Nb^{5+}$ is 49.5-65%, preferably 51-62%.

Moderately bringing in $W^{6+}$ can decrease the devitrification temperature and increase the chemical stability of the optical glasses of the present invention, but growth of the glass pigmentation will make the transmittance decreased if the content is more than 10%. Therefore, the content of $W^{6+}$ is preferably 0-10%, further preferably 0.5-8.5%.

Moderately bringing in $Zr^{4+}$ can prevent glass devitrification, decrease devitrification temperature and improve the chemical stability of the optical glass. In case the content is higher than 8% in the present invention, the glass becomes hard to melt. With the increase of the smelting temperature, inclusions tend to be occurred in the glass, with the decrease of transmittance. Therefore, the upper limited content of $Zr^{4+}$ is 8%, further preferably 7.5%; while the lower limited content of $Zr^{4+}$ is 0%, further preferably 0.5%.

$Li^+$, $Na^+$, and $K^+$ are better glass fluxing components, which can effectively lower glass transition temperature. Optical glass with better uniformity can be obtained by appropriate amount of these components. If the total amount ($Li^+ + Na^+ + K^+$) of $Li^+$, $Na^+$, $K^+$ is less than 8%, fluxing will not function, and the high temperature viscosity of glass may be larger; if the total amount of $Li^+$, $Na^+$, $K^+$ is higher than 25%, the chemical stability of optical glass will get worse and refractive index and dispersion will fail to meet the required range. Therefore, the total content of $Li^+$, $Na^+$ and $K^+$ is 8-25%, preferably 8-23%, further preferably 10-20%.

$Ba^{2+}$ is an effective and cheaper component which can lead to the high refractivity, but devitrification can easily occur and the transition temperature of glass rises if the content of $Ba^{2+}$ is more than 10%. Therefore, the content of $Ba^{2+}$ is confined to 0-10%, preferably 0.5-8%. Besides, according to the lots of researches by the Inventor, the weight ratio between the content of $Ba^{2+}$ and the content of $Nb^{5+}$ ($Ba^{2+}/Nb^{5+}$) is controlled to be 0.5 or less, preferably 0.3 or less, further preferably 0.01-0.2, and the glass has excellent transmittance.

$Zn^{2+}$, $Sr^{2+}$ and $Ca^{2+}$ can effectively adjust the refractive index and Abbe number of glass. When the total content exceeds 10%, the chemical durability of the glass provided by the present invention declines. Therefore, the total contents ($Zn^{2+} + Sr^{2+} + Ca^{2+}$) of $Zn^{2+}$, $Sr^{2+}$ and $Ca^{2+}$ is 0-10%, preferably 0-8%, further preferably 0-5%.

$B^{3+}$ is also an optical glass network generating component with better fluxing function. When the content of $B^{3+}$ exceeds 5%, the chemical stability of glass becomes poor. Therefore, the content of $B^{3+}$ is 0-5%, preferably 0-3%.

$Sb^{3+}$ is used as a clarifying agent in the glass provided by the present invention, with content of 0-0.2%, preferably 0-0.1%.

In addition, what needs to be stressed is that, the glass provided by the present invention contains no $Ti^{4+}$ and $Ti^{4+}$ compounds. This fact is very helpful for the low Pg,F and high transmittance of the glass provided herein.

The optical glass provided by the present invention is made according to the preparation method known by a person skilled in the art, i.e., melting, clarifying, stirring the raw materials for homogenization, lowering the temperature to a proper temperature for molding, then obtaining the optical glass provided by the present invention, with the refractive index of 1.81-1.89, the Abbe number of 20-29, Pg,F of 0.5956-0.6199, high transmittance and good chemical stability.

Each performance parameter of the optical glass provided by the present invention is tested by the following methods:

The refractive index (nd) and Abbe number (vd) are measured as per *Test Methods of Colorless Optical Glass* (*GB/T 7962.1-2010*): *Refractive Index and Coefficient of Dispersion*.

The relative partial dispersion Pg,F is calculated by the Formula (1):

$$Pg,F=(ng-nF)/(nF-nC) \tag{1}$$

Verified by the test, the optical glass provided by the present invention has the following properties: the refractive index (nd) ranges from 1.81-1.89, Abbe number (vd) ranges from 20-29, and Pg,F ranges from 0.5956-0.6199.

The degree of staining ($\lambda_{70}/\lambda_5$) of the glass: It can be measured by the spectral transmittance calculations of glass samples of two opposite 10±0.1 mm-thick optical polished flats.

Verified by the test, when the transmittance of the glass provided by the present invention is 70%, the corresponding wave length $\lambda_{70}$ is below 450 nm, preferably below 430 nm, more preferably below 410 nm.

The powder-method water-resistant stability $D_W$ of the glass is measured as per GB/T17129.

The powder-method acid-resistant $D_A$ of the glass is measured as per GB/T17129.

Verified by the test, the water-resistant stability $D_W$ of the glass provided by the present invention is above the Grade 2, preferably above the Grade 1; the acid-resistant $D_A$ of the glass provided by the present invention is above the Grade 2, preferably above the Grade 1.

The present invention further provides an optical element formed by the optical glass in the present invention, so this optical element has all above-mentioned properties of the optical glass in the present invention. The optical glass provided by the present invention has a high refractivity and high dispersion, small relative partial dispersion (Pg,F), high transmittance and good chemical stability with the refractive index of 1.81-1.89, the Abbe number of 20-29 and Pg,F of 0.5956-0.6199. The optical element provided by the present invention is applied to the digital camera, digital video, etc. to well correct high-order chromatic aberration and to meet the demands of miniaturization and light-weighting.

EMBODIMENT

To further understand the technical scheme of the present invention, preferred implementations of the present invention will be described by combining the following specific embodiments. But it should be noted and understood that, these embodiments are only to better describe the characteristics and advantages of the present invention, without limiting the claims of the present invention.

The optical glass component (by weight percentage of cation) provided by the embodiments 1-30 of the present invention and corresponding properties thereof are as shown in Tables 1-3. The desired optical glass can be obtained by weighing the oxides and carbonate corresponded with various cation components of the optical glass in each embodiment in Tables 1-3 according to the weight percentage, and adding them into an optical glass furnace after uniformly mixing; and pouring the molten glass into the pre-heated metal mold for molding and annealing after melting, clarifying, stirring for homogenization at a proper process temperature and lowering the temperature to a proper temperature.

The present invention provides an optical glass with high refractivity and high dispersion, small relative partial dispersion (Pg,F), high transmittance and good chemical stability, containing the components and corresponding properties as below: results of the refractive index (vd), dispersion (nF−nC), Abbe number (vd), relative partial dispersion (Pg, F), powder water-resistant stability $D_W$, powder acid-resistant stability $D_A$ and the degree of staining ($\lambda_{70}/\lambda_5$) are as shown in embodiments 1-30 from Table 1 to Table 3.

TABLE 1

| | | Embodiment | | | | | | | | | |
|---|---|---|---|---|---|---|---|---|---|---|---|
| | | 1 | 2 | 3 | 4 | 5 | 6 | 7 | 8 | 9 | 10 |
| Cation components (%) | $Si^{4+}$ | 12.00 | 16.35 | 16.12 | 17.02 | 17.40 | 15.69 | 14.12 | 16.61 | 15.26 | 19.01 |
| | $B^{3+}$ | 5.00 | 0.00 | 0.00 | 0.28 | 0.00 | 0.00 | 0.00 | 0.00 | 0.00 | 0.00 |
| | $Zr^{4+}$ | 0.00 | 1.29 | 4.05 | 2.70 | 5.38 | 6.72 | 7.56 | 6.42 | 4.70 | 3.61 |
| | $W^{6+}$ | 6.03 | 4.16 | 3.91 | 1.43 | 0.00 | 2.88 | 0.00 | 1.37 | 2.88 | 3.87 |
| | $Na^+$ | 10.60 | 11.67 | 13.99 | 12.15 | 14.46 | 13.46 | 24.10 | 12.86 | 17.49 | 12.07 |
| | $Li^+$ | 1.41 | 0.81 | 0.38 | 0.85 | 0.00 | 1.69 | 0.00 | 0.97 | 0.84 | 1.51 |
| | $K^+$ | 0.00 | 1.16 | 0.00 | 0.00 | 1.29 | 0.00 | 0.00 | 0.00 | 0.00 | 0.68 |
| | $Nb^{5+}$ | 56.43 | 55.01 | 61.43 | 57.26 | 61.31 | 54.55 | 53.32 | 56.96 | 57.05 | 59.12 |
| | $Zn^{2+}$ | 0.00 | 0.00 | 0.00 | 0.00 | 0.00 | 0.00 | 0.00 | 0.00 | 0.00 | 0.00 |
| | $Ba^{2+}$ | 8.39 | 9.40 | 0.00 | 8.15 | 0.00 | 4.88 | 0.80 | 4.66 | 1.63 | 0.00 |
| | $Sr^{2+}$ | 0.00 | 0.00 | 0.00 | 0.00 | 0.00 | 0.00 | 0.00 | 0.00 | 0.00 | 0.00 |
| | $Ca^{2+}$ | 0.00 | 0.00 | 0.00 | 0.00 | 0.00 | 0.00 | 0.00 | 0.00 | 0.00 | 0.00 |
| | $Sb^{3+}$ | 0.13 | 0.15 | 0.13 | 0.15 | 0.16 | 0.15 | 0.10 | 0.15 | 0.15 | 0.13 |
| | Total | 100 | 100 | 100 | 100 | 100 | 100 | 100 | 100 | 100 | 100 |
| | $Nb^{5+} + W^{6+} + Zr^{4+}$ | 62.46 | 60.46 | 69.38 | 61.39 | 66.69 | 64.15 | 60.88 | 64.75 | 64.63 | 66.60 |
| | $Li^+ + Na^+ + K^+$ | 12.01 | 13.64 | 14.37 | 13.00 | 15.75 | 15.15 | 24.10 | 13.83 | 18.33 | 14.26 |
| | $Ba^{2+}/Nb^{5+}$ | 0.15 | 0.17 | 0.00 | 0.14 | 0.00 | 0.09 | 0.02 | 0.08 | 0.03 | 0.00 |
| | $Zn^{2+} + Sr^{2+} + Ca^{2+}$ | 0.00 | 0.00 | 0.00 | 0.00 | 0.00 | 0.00 | 0.00 | 0.00 | 0.00 | 0.00 |
| Anion components (%) | $O^{2-}$ | 100 | 100 | 100 | 100 | 100 | 100 | 100 | 100 | 100 | 100 |
| | Total | 100 | 100 | 100 | 100 | 100 | 100 | 100 | 100 | 100 | 100 |
| | nd | 1.84267 | 1.84062 | 1.86452 | 1.83712 | 1.85457 | 1.83356 | 1.81300 | 1.84043 | 1.83654 | 1.84013 |
| | nF-nC | 0.03393 | 0.03384 | 0.03650 | 0.03327 | 0.03525 | 0.03254 | 0.03115 | 0.03330 | 0.03365 | 0.03356 |
| | vd | 24.83 | 24.84 | 23.69 | 25.16 | 24.24 | 25.62 | 26.10 | 25.24 | 24.86 | 25.03 |
| | Pg, F | 0.6106 | 0.6105 | 0.6155 | 0.6113 | 0.6130 | 0.6100 | 0.5990 | 0.6101 | 0.6116 | 0.6125 |
| | $\lambda_{70}/\lambda_5$ (nm) | 401/363 | 398/363 | 435/367 | 401/364 | 425/364 | 397/363 | 393/360 | 396/363 | 402/364 | 422/364 |
| | $D_W$ | 1 | 1 | 1 | 1 | 1 | 1 | 1 | 1 | 1 | 1 |
| | $D_A$ | 1 | 1 | 1 | 1 | 1 | 1 | 1 | 1 | 1 | 1 |

TABLE 2

| | | Embodiment | | | | | | | | | |
|---|---|---|---|---|---|---|---|---|---|---|---|
| | | 11 | 12 | 13 | 14 | 15 | 16 | 17 | 18 | 19 | 20 |
| Cation components (%) | $Si^{4+}$ | 18.00 | 19.38 | 25.00 | 15.90 | 15.77 | 15.30 | 17.18 | 17.10 | 16.05 | 15.15 |
| | $B^{3+}$ | 0.00 | 0.00 | 0.00 | 0.48 | 0.00 | 0.00 | 0.00 | 0.00 | 0.00 | 0.00 |
| | $Zr^{4+}$ | 0.00 | 8.00 | 5.78 | 4.76 | 2.50 | 4.84 | 2.55 | 2.13 | 6.93 | 1.33 |
| | $W^{6+}$ | 5.05 | 0.00 | 0.00 | 0.00 | 4.01 | 4.10 | 4.10 | 5.87 | 6.19 | 2.86 |
| | $Na^+$ | 10.11 | 10.00 | 4.78 | 10.64 | 14.39 | 12.78 | 14.72 | 13.86 | 12.73 | 13.36 |
| | $Li^+$ | 1.98 | 2.50 | 3.22 | 0.67 | 0.63 | 0.96 | 0.64 | 0.60 | 0.72 | 0.84 |
| | $K^+$ | 0.00 | 0.00 | 0.00 | 0.63 | 0.70 | 0.00 | 0.00 | 0.00 | 0.00 | 0.00 |
| | $Nb^{5+}$ | 53.58 | 50.00 | 61.11 | 57.06 | 56.58 | 54.17 | 59.11 | 60.31 | 52.36 | 56.64 |
| | $Zn^{2+}$ | 0.00 | 0.00 | 0.00 | 9.73 | 0.00 | 0.00 | 0.00 | 0.00 | 0.00 | 0.00 |
| | $Ba^{2+}$ | 9.15 | 10.00 | 0.00 | 0.00 | 5.29 | 7.71 | 1.55 | 0.00 | 4.89 | 9.68 |
| | $Sr^{2+}$ | 1.00 | 0.00 | 0.00 | 0.00 | 0.00 | 0.00 | 0.00 | 0.00 | 0.00 | 0.00 |
| | $Ca^{2+}$ | 1.00 | 0.00 | 0.00 | 0.00 | 0.00 | 0.00 | 0.00 | 0.00 | 0.00 | 0.00 |
| | $Sb^{3+}$ | 0.13 | 0.12 | 0.11 | 0.13 | 0.13 | 0.13 | 0.15 | 0.13 | 0.13 | 0.15 |
| | Total | 100 | 100 | 100 | 100 | 100 | 100 | 100 | 100 | 100 | 100 |
| | $Nb^{5+} + W^{6+} + Zr^{4+}$ | 58.63 | 58.00 | 66.89 | 61.82 | 63.09 | 63.11 | 65.76 | 68.31 | 65.48 | 60.83 |
| | $Li^+ + Na^+ + K^+$ | 12.09 | 12.50 | 8.00 | 11.94 | 15.72 | 13.74 | 15.36 | 14.46 | 13.45 | 14.20 |
| | $Ba^{2+}/Nb^{5+}$ | 0.17 | 0.20 | 0.00 | 0.00 | 0.09 | 0.14 | 0.03 | 0.00 | 0.09 | 0.17 |

TABLE 2-continued

|  |  | Embodiment | | | | | | | | | |
|---|---|---|---|---|---|---|---|---|---|---|---|
|  |  | 11 | 12 | 13 | 14 | 15 | 16 | 17 | 18 | 19 | 20 |
|  | $Zn^{2+}$ + $Sr^{2+}$ + $Ca^{2+}$ | 2.00 | 0.00 | 0.00 | 9.73 | 0.00 | 0.00 | 0.00 | 0.00 | 0.00 | 0.00 |
| Anion | $O^{2-}$ | 100 | 100 | 100 | 100 | 100 | 100 | 100 | 100 | 100 | 100 |
| components (%) | Total | 100 | 100 | 100 | 100 | 100 | 100 | 100 | 100 | 100 | 100 |
|  | nd | 1.83041 | 1.81205 | 1.81000 | 1.88250 | 1.84375 | 1.84630 | 1.83969 | 1.84824 | 1.83771 | 1.85295 |
|  | nF-nC | 0.03240 | 0.02889 | 0.03213 | 0.03622 | 0.03436 | 0.03385 | 0.03443 | 0.03516 | 0.03346 | 0.03461 |
|  | vd | 25.63 | 28.10 | 25.21 | 24.36 | 24.55 | 25.00 | 24.39 | 24.13 | 25.03 | 24.64 |
|  | Pg, F | 0.6110 | 0.5960 | 0.6132 | 0.6121 | 0.6112 | 0.6103 | 0.6111 | 0.6130 | 0.6125 | 0.6120 |
|  | $\lambda_{70}/\lambda_5$ (nm) | 398/363 | 396/360 | 423/364 | 429/365 | 398/363 | 396/363 | 410/364 | 430/366 | 402/364 | 405/364 |
|  | $D_W$ | 1 | 1 | 1 | 1 | 1 | 1 | 1 | 1 | 1 | 1 |
|  | $D_A$ | 1 | 1 | 1 | 1 | 1 | 1 | 1 | 1 | 1 | 1 |

TABLE 3

|  |  | Embodiment | | | | | | | | | |
|---|---|---|---|---|---|---|---|---|---|---|---|
|  |  | 21 | 22 | 23 | 24 | 25 | 26 | 27 | 28 | 29 | 30 |
| Cation components (%) | $Si^{4+}$ | 15.45 | 17.83 | 16.18 | 22.87 | 14.73 | 15.94 | 15.72 | 16.10 | 15.52 | 14.19 |
|  | $B^{3+}$ | 0.49 | 0.00 | 0.00 | 0.00 | 0.00 | 0.28 | 0.00 | 0.00 | 0.00 | 0.00 |
|  | $Zr^{4+}$ | 0.00 | 0.00 | 3.73 | 2.71 | 2.55 | 4.38 | 7.29 | 3.71 | 4.11 | 4.37 |
|  | $W^{6+}$ | 6.24 | 3.56 | 3.99 | 10.00 | 4.10 | 4.27 | 2.60 | 3.97 | 4.39 | 6.69 |
|  | $Na^+$ | 10.50 | 12.75 | 14.01 | 8.17 | 14.69 | 13.33 | 12.17 | 12.78 | 15.71 | 16.26 |
|  | $Li^+$ | 2.19 | 0.35 | 0.00 | 0.57 | 0.64 | 0.41 | 1.90 | 0.73 | 0.43 | 0.78 |
|  | $K^+$ | 0.00 | 0.00 | 1.05 | 0.00 | 0.00 | 0.00 | 0.00 | 0.00 | 0.00 | 0.00 |
|  | $Nb^{5+}$ | 65.00 | 55.99 | 55.55 | 55.58 | 57.76 | 56.45 | 55.04 | 54.17 | 58.04 | 53.04 |
|  | $Zn^{2+}$ | 0.00 | 0.00 | 0.00 | 0.00 | 0.00 | 0.00 | 0.00 | 0.00 | 0.00 | 0.00 |
|  | $Ba^{2+}$ | 0.00 | 9.39 | 5.36 | 0.00 | 5.40 | 4.82 | 5.14 | 8.41 | 1.65 | 4.53 |
|  | $Sr^{2+}$ | 0.00 | 0.00 | 0.00 | 0.00 | 0.00 | 0.00 | 0.00 | 0.00 | 0.00 | 0.00 |
|  | $Ca^{2+}$ | 0.00 | 0.00 | 0.00 | 0.00 | 0.00 | 0.00 | 0.00 | 0.00 | 0.00 | 0.00 |
|  | $Sb^{3+}$ | 0.13 | 0.13 | 0.13 | 0.10 | 0.15 | 0.12 | 0.14 | 0.13 | 0.15 | 0.13 |
|  | Total | 100 | 100 | 100 | 100 | 100 | 100 | 100 | 100 | 100 | 100 |
|  | $Nb^{5+}$ + $W^{6+}$ + $Zr^{4+}$ | 71.24 | 59.55 | 63.27 | 68.29 | 64.41 | 65.10 | 64.93 | 61.85 | 66.54 | 64.10 |
|  | $Li^+$ + $Na^+$ + $K^+$ | 12.69 | 13.10 | 15.06 | 8.74 | 15.33 | 13.74 | 14.07 | 13.51 | 16.14 | 17.04 |
|  | $Ba^{2+}/Nb^{5+}$ | 0.00 | 0.17 | 0.10 | 0.00 | 0.09 | 0.09 | 0.09 | 0.16 | 0.03 | 0.09 |
|  | $Zn^{2+}$ + $Sr^{2+}$ + $Ca^{2+}$ | 0.00 | 0.00 | 0.00 | 0.00 | 0.00 | 0.00 | 0.00 | 0.00 | 0.00 | 0.00 |
| Anion | $O^{2-}$ | 100 | 100 | 100 | 100 | 100 | 100 | 100 | 100 | 100 | 100 |
| components (%) | Total | 100 | 100 | 100 | 100 | 100 | 100 | 100 | 100 | 100 | 100 |
|  | nd | 1.89000 | 1.83111 | 1.84275 | 1.81121 | 1.85965 | 1.84793 | 1.83835 | 1.83979 | 1.85077 | 1.84254 |
|  | nF-nC | 0.04450 | 0.03345 | 0.03437 | 0.03278 | 0.03556 | 0.03457 | 0.03271 | 0.03354 | 0.03515 | 0.03420 |
|  | vd | 20.00 | 24.85 | 24.52 | 24.75 | 24.17 | 24.52 | 25.63 | 25.04 | 24.21 | 24.64 |
|  | Pg, F | 0.6153 | 0.6105 | 0.6113 | 0.6151 | 0.6119 | 0.6108 | 0.6103 | 0.6102 | 0.6109 | 0.6113 |
|  | $\lambda_{70}/\lambda_5$ (nm) | 445/367 | 396/363 | 398/363 | 425/364 | 399/363 | 396/363 | 396/363 | 396/363 | 397/363 | 399/363 |
|  | $D_W$ | 1 | 1 | 1 | 1 | 1 | 1 | 1 | 1 | 1 | 1 |
|  | $D_A$ | 1 | 1 | 1 | 1 | 1 | 1 | 1 | 1 | 1 | 1 |

As can be seen from above embodiments, the present invention provides an optical glass with the refractive index of 1.81-1.89, the Abbe number of 20-29 and Pg,F of 0.5956-0.6199, characterized by high refractivity and high dispersion, small relative partial dispersion (Pg,F), high transmittance and good chemical stability. The optical element of the optical glass applies to the digital camera, digital video, etc., to well correct high-order chromatic aberration and to meet the demands of miniaturization and light-weighting.

The invention claimed is:

1. An optical glass, with anion as $O^{2-}$, wherein a cation thereof contains the following components by weight percentage: 12-25% of $Si^{4+}$; 58-75% of $Nb^{5+}+W^{6+}+Zr^{4+}$; 8-25% of $Li^++Na^++K^+$; 10% of $Ba^{2+}$ or less.

2. The optical glass according to claim 1, further containing: 0-5% of $B^{3+}$; 0-0.2% of $Sb^{3+}$; 0-10% of $Zn^{2+}+Sr^{2+}+Ca^{2+}$.

3. The optical glass according to claim 1, wherein ($Ba^{2+}/Nb^{5+}$) is 0.5 or less.

4. The optical glass according to claim 1, wherein $Ti^{4+}$ is excluded.

5. The optical glass according to claim 1, further containing: 12-23% of $Si^{4+}$; and/or 60-72% of $Nb^{5+}+W^{6+}+Zr^{4+}$; and/or 8-23% of $Li^++Na^++K^+$; and/or 0.5-8% of $Ba^{2+}$; and/or 0-3% of $B^{3+}$; and/or 0-0.1% of $Sb^{3+}$; and/or 0.3 or less of $(Ba^{2+}/Nb^{5+})$; and/or 0-8% of $Zn^{2+}+Sr^{2+}+Ca^{2+}$.

6. The optical glass according to claim 1, further containing: 12-20% of $Si^{4+}$; and/or 62-70% of $Nb^{5+}+W^{6+}+Zr^{4+}$; and/or 10-20% of $Li^++Na^++K^+$; and/or 0-5% of $Zn^{2+}+Sr^{2+}+Ca^{2+}$; and/or 0.01-0.2 of $(Ba^{2+}/Nb^{5+})$.

7. The optical glass according to claim 1, wherein the refractive index of optical glass is 1.81-1.89, the Abbe number is 20-29, Pg,F is 0.5956-0.6199, and the corresponding wave length $\lambda_{70}$ is below 450 nm when the transmittance reaches up to 70%.

8. An optical element made of the optical glass according to claim 1.

9. An optical glass, with anion as $O^{2-}$, wherein a cation contains the following components by weight percentage: 12-25% of $Si^{4+}$; 49.5-65% of $Nb^{5+}$; 0-8% of $Zr^{4+}$; 0-10% of $W^{6+}$; 8-25% of $Li^++Na^++K^+$; and/or 10% or less of $Ba^{2+}$.

10. The optical glass according to claim 9, further containing: 0-5% of $B^{3+}$; 0-0.2% of $Sb^{3+}$; 0-10% of $Zn^{2+}+Sr^{2+}+Ca^{2+}$.

11. An optical glass, with anion as $O^{2-}$, wherein a cation contains the following components by weight percentage: 12-25% of $Si^{4+}$; 49.5-65% of $Nb^{5+}$; 0-8% of $Zr^{4+}$; 0-10% of $W^{6+}$; 8-25% of $Li^++Na^++K^+$; 10% of $Ba^{2+}$ or less; 0-5% of $B^{3+}$; 0-0.2% of $Sb^{3+}$; 0-10% of $Zn^{2+}+Sr^{2+}+Ca^{2+}$.

12. The optical glass according to claim 9, wherein $(Ba^{2+}/Nb^{5+})$ is 0.5 or less.

13. The optical glass according to claim 9, wherein $Ti^{4+}$ is excluded.

14. The optical glass according to claim 9, containing: 12-23% of $Si^{4+}$; and/or 51-62% of $Nb^{5+}$; and/or 0.5-7.5% of $Zr^{4+}$; and/or 0.5-8.5% of $W^{6+}$; and/or 8-23% of $Li^++Na^++K^+$; and/or 0.5-8% of $Ba^{2+}$; and/or 0-8% of $Zn^{2+}+Sr^{2+}+Ca^{2+}$; and/or 0.3 or less of $(Ba^{2+}/Nb^{5+})$; and/or 0-3% of $B^{3+}$; and/or 0-0.1% of $Sb^{3+}$.

15. The optical glass according to claim 9, containing: 12-20% of $Si^{4+}$; and/or 0.01-0.2 of $(Ba^{2+}/Nb^{5+})$; and/or 10-20% of $Li^++Na^++K^+$; and/or 0-5% of $Zn^{2+}+Sr^{2+}+Ca^{2+}$.

* * * * *